Nov. 29, 1966  J. F. LYNCH ETAL  3,288,443
DEVICE FOR MIXING AND FEEDING
Filed July 27, 1964  2 Sheets-Sheet 1

INVENTORS
JOHN F. LYNCH
RAYMOND A. NICHOLS
BY
ATTORNEYS

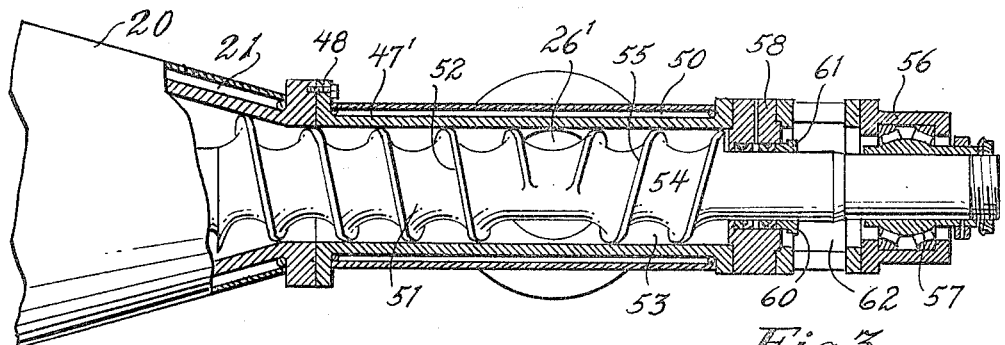
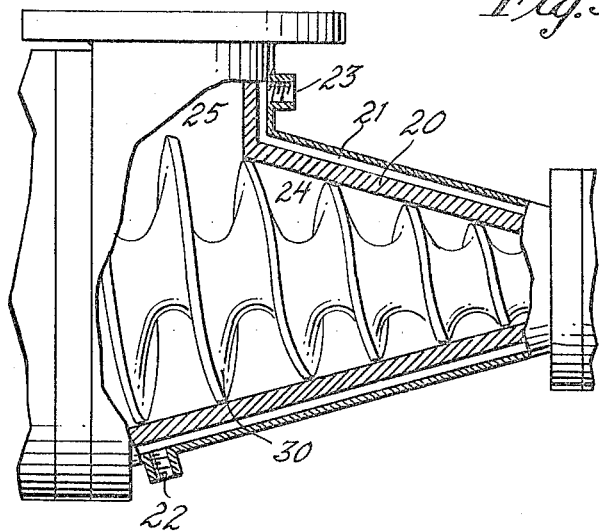
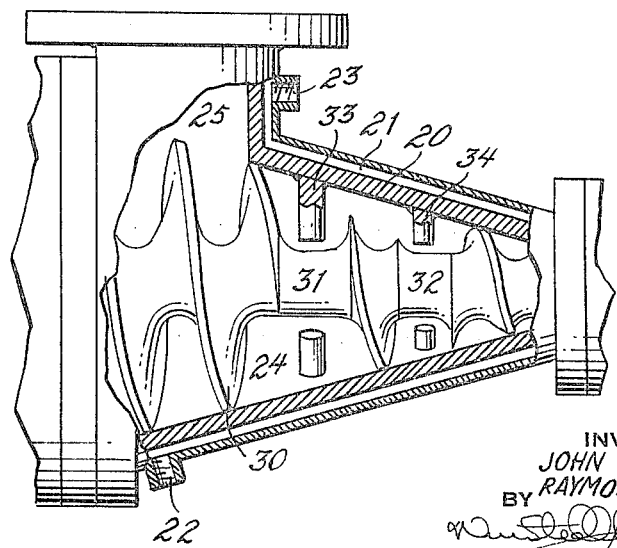

United States Patent Office 3,288,443
Patented Nov. 29, 1966

3,288,443
DEVICE FOR MIXING AND FEEDING
John F. Lynch, Chester, Pa., and Raymond A. Nichols, Wilmington, Del., assignors to Marco Development Co., Inc., Wilmington, Del., a corporation of Delaware
Filed July 27, 1964, Ser. No. 385,383
1 Claim. (Cl. 259—9)

The present invention relates to rotary mixers and feeding devices of the screw impeller type.

A purpose of the invention is to prevent difficulty in mixing and feeding liquid or semi-liquid media which have a tendency to form froth.

A further purpose is to provide a forward feeding froth receiving section rearward of the main impeller and the main impeller chamber so as to remove vapors of solvent and the like which may otherwise cause difficulty by forming froth.

A further purpose is to assist in forward progressing of the medium from the main impeller chamber forward of the froth receiving chamber by providing a straight forward impeller between the main tapered impeller and the outlet.

A further purpose is to avoid building up excessive froth and depositing material which might become degraded in the forward end of the mixer by providing a reverse feeding section beyond the outlet and preferably beyond the straight forward feed.

A further purpose is to interrupt the flights of the screw of the main impeller to create turbulence.

A further purpose is to provide shear abutments at points of interruption of the flights of the main impeller.

Further purposes appear in the specification and in the claims.

In the drawings we have chosen to illustrate a few only of the many embodiments in which the invention may appear, selecting the forms shown from the standpoints of convenience in illustration, satisfactory operation and clear demonstration of the principles involved.

FIGURE 3 is a fragmentary vertical axial section of a modified form of the forward end of the device shown in FIGURES 1 and 2.

FIGURE 4 is an enlarged fragmentary side elevation, partly in vertical axial section, of the main impeller portion of the device of FIGURES 1 and 2 somewhat modified.

FIGURE 5 is an enlarged fragmentary side elevation, partly in vertical axial section, of a further modification of the main impeller section of the device of FIGURES 1 and 2.

Figure 1:
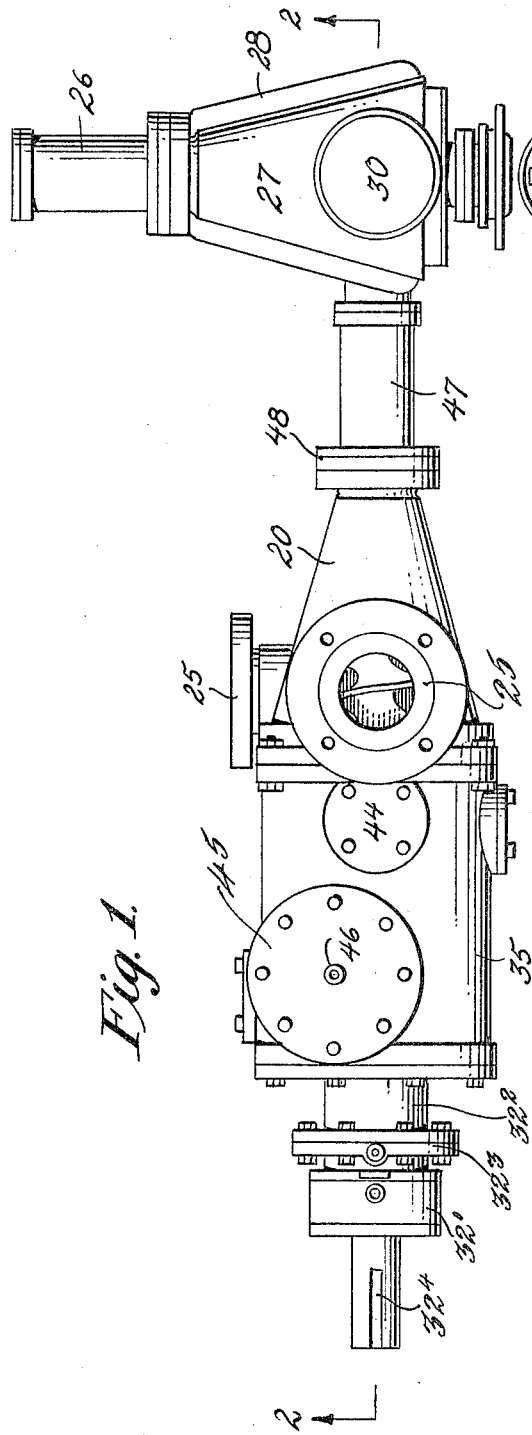
FIGURE 1 is a top plan view of the device of the invention, the illustration being generally diagrammatic.

Describing in illustration but not in limitation and referring to the drawings:

Extensive use is being made of rotary screw impeller mixing and feeding devices, of the type which employ a main impeller section, usually conical and reducing in diameter from the inlet to the outlet, and housing a similarly conical main impeller. These devices are being used for feeding and mixing chemicals, plastics, foods, and industrial products of liquid or semi-liquid form, of a variety too large to enumerate.

One of the serious difficulties which has developed is that many of these media are not entirely homogeneous, but include ingredients of a more or less viscous nature and also volatile or relatively volatile solvents or lighter ingredients. Often air or gas is included unintentionally or undesirably, and often solvent vapors in effect produce gaseous components. As a consequence many of the materials which must be handled in such impeller devices contain or tend to produce froth or foam. This may be a serious difficulty and in some cases has caused unintended back pressure or back flow, the foam tending to discharge or actually discharging through the inlet.

The invention is concerned particularly with mixing and feeding ingredients that will produce foam.

Another aspect of the invention is the problem of degraded portions of the medium which may accumulate adjacent the forward end of the impeller and also of the tendency of the device to build up excessive pressures adjoining the forward end of the impeller. As a means of protecting against this, in one form of the invention a reverse screw is placed on the impeller forward of the outlet to prevent accumulation of medium at that point.

In some forms of the device the main impeller has a screw with interrupted flights to create turbulence and in one embodiment radially projecting abutments are provided opposite the interruptions in the screw flights to produce shear of the medium.

Figure 2:
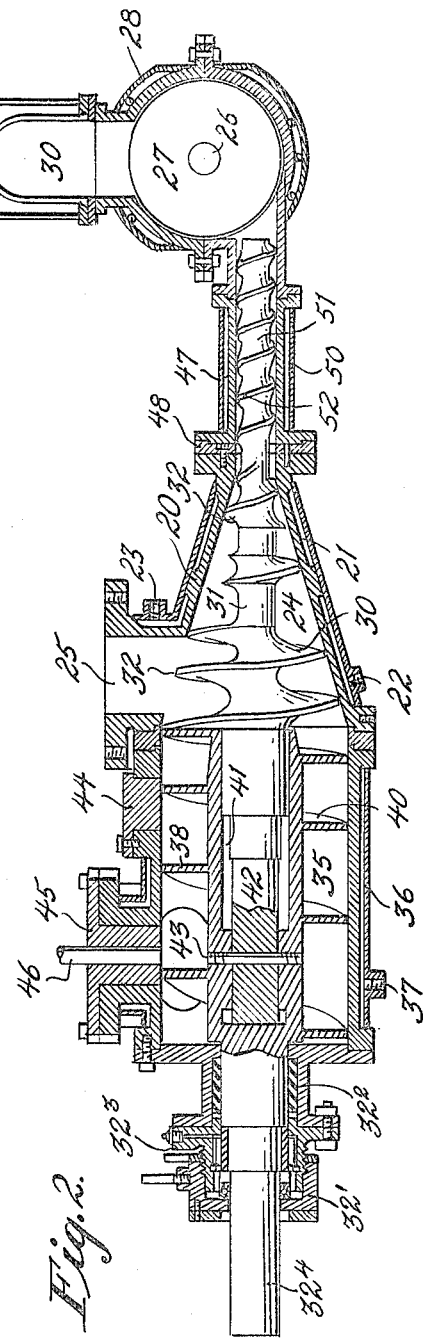
FIGURE 2 is a vertical axial section of the device of the invention.

Considering first the drawings as shown in FIGURES 1 and 2, we there illustrate a rotary mixing and feeding device having a main mixing chamber housing 20 which is suitably tapering from a large end to a small end and is provided with a jacket 21 through which heating or cooling media can be circulated through suitable inlet and outlet openings 22 and 23, only a few of which have been shown.

The main impeller housing defines a tapering main impeller chamber 24. Adjacent the large end of the main impeller housing are medium inlet openings 25 which connect to suitable piping and pump means for introducing the medium to be mixed and/or fed by the device. Adjacent the forward end and in this case suitably forward of the small end of the main impeller chamber 24 is an outlet connection which suitably will connect to the space adjoining the impeller by an outlet chamber 27 provided with a suitable heating or cooling jacket 28. The outlet chamber 27 contains a tapered screw 26 suitably driven (the end of the screw only is shown). Above the outlet chamber is a dome 30 for accumulation of gases, provided with a heating or cooling jacket 31. The dome forms no part of the present invention.

In the main impeller chamber 24 there is a suitably conical main impeller 32 which is journalled at the rearward end on suitable bearings $32^1$ and provided with suitable seals $32^2$ and suitable lubrication means $32^3$, all as well known in the art, the main impeller having a shank $32^4$ which is connected to a suitable drive from a suitable speed reducer driven by a suitable motor not shown.

The main impeller is turned in a direction to make its screw flights 30 drive the medium forward from the inlet 25 to the outlet 27 and has a suitable pitch and a suitable slight clearance from the housing, which is of course circular in cross section transverse to the paper in FIGURE 2.

The main impeller may in some forms have interrupted screw flights at 31 and 32 which tend to produce turbulence in the medium by allowing slippage of the medium. This can be employed in the form of FIGURES 1 and 2 without any shear means, or as shown in FIGURE 4 the screw flights on the main impeller can be continuous from end to end. In some cases, however, it is desirable to provide shear abutments and in FIGURE 5 at each of the interruptions in the flight there are a series of radially inwardly extending shear abutments 33 and 34 in the form of pins welded to the housing, the intention being that three be equally spaced around the circumference at each location, only two of the pins at each location being shown.

Located rearwardly of the main impeller chamber 24 and coaxially with respect to it is a froth chamber 35 which is desirably provided with a suitable jacket 36 to receive a hot or cold heat transfer fluid, the jacket having inlet and outlet connections, only one of which is shown at 37. The froth chamber is circular in the section transverse to the plane of the paper, and cylindrical, and has rotating therein a series of screw flights 38 of a screw impeller 40 which is effectively connected to the main impeller 30 by providing an axial recess 41 in the froth impeller 40 and extending shank 42 into the recess and providing a suitably threaded pin connection 43 so that the two impellers turn together. The direction of the screw flights 38 on the impeller 40 in the froth chamber is the same as that of the main impeller 40 so that the impeller in the froth chamber is tending to pump forward a froth that enters the froth chamber. The froth chamber is provided with suitable side connections 44 and 45, and one or both of these is adapted to provide a vacuum or suction connection to remove vapors and thus tend to reduce the bulk of any froth that enters the froth chamber. A vacuum connection is shown at 46 near the rearward end of the froth chamber but additional vacuum connections can be provided as desired.

In many cases it is desirable to provide a forward axial extension in front of the main impeller chamber to more effectively pump the medium against the vacuum applied in the froth chamber. In FIGURES 1 and 2 we show a cylindrical extension 47 on the forward end of the main impeller chamber 24 and united thereto as by flanges 48 suitably bolted together. The forward extension chamber has a heating and cooling jacket 50 for circulation of a heating or cooling medium through connections not shown.

On the forward end of the main impeller is a forward impeller extension 51 which has threaded flights 52 which extend in the same direction as the threads on the main impeller and tend to pump the medium forward into the outlet 26. The flights of course have a slight clearance from the circular cross-sectional interior contour of the extension chamber 47.

In this form of the device there is no need for an additional bearing at the front, the screw impeller being lubricated by the meidum itself which tends to be interposed between the impeller and the wall of the chamber.

In operation of the device of FIGURES 1 and 2, it will be evident that a suitable medium to be mixed, homogenized, pumped and/or dispensed, enters through the inlet connection 25 and is engaged in the main impeller chamber 24 by the flights of the main impeller 30. These tend to produce a positive flow forward and mix and homogenize the medium and also permit this action by slip at interruption 31. In the form of FIGURE 4 slip does not occur except in the area between the flights but in the form of FIGURE 5 there is not only slip at the interruptions but also shear which further tends to mix the medium.

If there is a marked tendency to froth in the medium the froth will enter the froth chamber 35 against the forward pumping action of the froth chamber impeller, but aided by the suction applied at 46 or elsewhere in the froth chamber. The effect is then both by a mechanical pumping action out of the froth chamber and by the suction or vacuum to break the bubbles and reduce the froth to a liquid free from gas, the gas being removed through the vacuum opening 46. Forward progression by the liquid to overcome the suction is aided by the forward impeller extension 51.

In some cases it is preferable to avoid the wear occurring on the interior of the impeller chambers by providing a positive bearing on the forward end of the impeller. In this case there is danger, however, that the forward pumping action will form a dead pocket near the forward end and the medium may degrade at that point and contaminate the main stream of medium. Furthermore there is danger that the forward pumping action may create a forward thrust which will damage the forward bearing or will cause leakage at the forward packing or seal.

To overcome this difficulty we provide in FIGURE 3 a forward bearing and a reverse pumping impeller section which protects the forward bearing and its seal. In this form the extension chamber 47' as already described has a side opening at 26' to the outlet and further forward has an additional cylindrical extension chamber in axial prolongation of the extension chamber 47' at 53. An extension of the impeller is provided which has reverse or rearwardly pumping screw flights 55 which are located forward of the outlet 26' and tend to prevent the medium from entering this forward portion 53. At the forward end of the housing there is provided a bearing retainer 56 in which a suitable antifriction bearing 57 is provided and rearward thereof there is a gasket mounting 58 which provides for supporting a gasket 60 tightened by a threaded packing gland 61 which is accessible through opening 62.

Thus in operation of the form of FIGURE 3, the series of impellers is journalled at both ends so that they cannot engage the housing at any point and in operation of this device there is protection against accumulation of medium in a dead space near the forward packing.

In view of our invention and disclosure variations and modifications to meet individual whim or particular need will doubtless become evident to others skilled in the art, to obtain all or part of the benefits of our invention without copying the structure shown, and we therefore claim all such insofar as they fall within the reasonable spirit and scope of our claim.

Having thus described our invention, what we claim as new and desire to secure by Letters Patent is:

In a device for feeding and mixing a liquid medium which is subject to frothing, the combination which includes, housing means comprising, a rearward froth chamber, a housing portion extending forwardly from said froth chamber, said froth chamber and said housing portion being intercommunicatingly coaxially hollow, a lateral inlet for the medium intermediately of said froth chamber and said housing portion, and an outlet forward of said inlet and communicating through the hollow interior of said housing portion with said inlet, and the device further including, vacuum applying means opening into the interior of said froth chamber at a location to the rear of the region of said inlet to apply vacuum to said chamber, and impeller means comprising forward and rearward screw impeller portions arranged for turning in unison in said housing means, said forward screw impeller portion extending within the interior of said housing portion and having thread-like surfaces leading from the region of said inlet toward said outlet to urge and progress the medium forwardly through said housing portion toward said outlet, and said rearward screw impeller portion extending within the interior of said froth chamber and having thread-like surfaces extending rearwardly from the region of said inlet for said rearward screw impeller portion to receive froth having a rearward direction of movement and pump the froth forwardly in said froth chamber while said vacuum applying means by vacuum reduces the froth to vapor and liquid.

References Cited by the Examiner

UNITED STATES PATENTS

| | | | |
|---|---|---|---|
| 1,156,096 | 10/1915 | Price | 18—12 |
| 2,434,690 | 1/1948 | Ferla | 18—12 |
| 3,023,455 | 3/1962 | Geier et al. | 259—9 X |
| 3,159,007 | 12/1964 | Rahauser et al. | 259—9 X |
| 3,163,403 | 12/1964 | Engels | 259—9 |
| 3,183,553 | 5/1965 | Slater | 259—9 |

FOREIGN PATENTS

| | | |
|---|---|---|
| 202,915 | 4/1959 | Austria. |
| 869,739 | 11/1941 | France. |

WALTER A. SCHEEL, *Primary Examiner.*

J. M. BELL, *Assistant Examiner.*